US012745099B2

(12) United States Patent
Nakahira et al.

(10) Patent No.: US 12,745,099 B2
(45) Date of Patent: Sep. 22, 2026

(54) BASE STATION CONTROL SYSTEM, BASE STATION CONTROL METHOD, BASE STATION CONTROL APPARATUS AND PROGRAM

(71) Applicant: NTT, Inc., Tokyo (JP)

(72) Inventors: Toshiro Nakahira, Tokyo (JP); Motoharu Sasaki, Tokyo (JP); Daisuke Murayama, Tokyo (JP); Shota Nakayama, Tokyo (JP); Takatsune Moriyama, Tokyo (JP); Yasushi Takatori, Tokyo (JP)

(73) Assignee: NTT, Inc., Tokyo (JP)

( * ) Notice: Subject to any disclaimer, the term of this patent is extended or adjusted under 35 U.S.C. 154(b) by 352 days.

(21) Appl. No.: 18/681,268

(22) PCT Filed: Sep. 1, 2021

(86) PCT No.: PCT/JP2021/032191
§ 371 (c)(1),
(2) Date: Feb. 5, 2024

(87) PCT Pub. No.: WO2023/032097
PCT Pub. Date: Mar. 9, 2023

(65) Prior Publication Data

US 2024/0349071 A1 Oct. 17, 2024

(51) Int. Cl.
*H04W 16/18* (2009.01)
*H04W 24/02* (2009.01)
*H04W 88/12* (2009.01)

(52) U.S. Cl.
CPC .......... *H04W 16/18* (2013.01); *H04W 24/02* (2013.01); *H04W 88/12* (2013.01)

(58) Field of Classification Search
CPC ...... H04W 16/18; H04W 24/02; H04W 88/12
(Continued)

(56) References Cited

U.S. PATENT DOCUMENTS

2015/0163836 A1* 6/2015 Kobayashi ............ H04W 48/06 370/329
2019/0199458 A1* 6/2019 Fukuhara ............. H04B 17/318
2022/0286955 A1 9/2022 Nakahira et al.

FOREIGN PATENT DOCUMENTS

JP 2014-212417 11/2014
JP 2019-117975 7/2019
WO 2021/024400 2/2021

OTHER PUBLICATIONS

Takuto Arai, Daisuke Goto, Masashi Iwabuchi, Tatsuhiko Iwakuni, and Kazuaki Maruta, "AMAP: Adaptive Movable Access Point System for Offloading Efficiency Enhancement", NTT Access Network Service Systems Laboratories, NTT Corporation, IEICE Technical Report, vol. 116, No. 46, RCS2016-43, pp. 107-112, May 2016.

* cited by examiner

*Primary Examiner* — Chi Tang P Cheng
(74) *Attorney, Agent, or Firm* — IPUSA, PLLC

(57) ABSTRACT

In a base station control system including a first base station and a base station control apparatus, the base station control apparatus reduces a deviation in the numbers of terminals connected to base stations by including a setting unit configured to set, to the first base station, at least one of a first threshold value regarding a reception power from a terminal in the first base station and a second threshold value indicating an maximum number of a number of terminals connected to the first base station as a threshold value for limiting terminals capable of connecting to the first base station.

6 Claims, 8 Drawing Sheets

(1)

(2)

(58) Field of Classification Search
USPC .......................................................... 370/329
See application file for complete search history.

CONTROL STATION 20-2

| BASE STATION NUMBER | BEFORE DISPOSITION OF MOVABLE BASE STATION | AFTER DISPOSITION OF MOVABLE BASE STATION |
| --- | --- | --- |
| 30-1 | 1 | 1 |
| 30-2 | 5 | 3 |
| 30-3 | 5 | 2 |
| 20-1 | - | 3 |
| 20-2 | - | 2 |

BASE STATION CONTROL SYSTEM, BASE STATION CONTROL METHOD, BASE STATION CONTROL APPARATUS AND PROGRAM

TECHNICAL FIELD

The present invention relates to a base station control system, a base station control method, a base station control apparatus, and a program.

BACKGROUND ART

In a case where wireless base stations are evenly deployed in an area in order to efficiently secure an area coverage, it is considered that a communication quality for a specific area deteriorates due to the influence of terminal congestion, shielding, and the like. On the other hand, a technique of dynamically deploying a movable base station in an area having a deteriorated communication quality to ameliorate the deterioration in the communication quality has been studied (Non-Patent Document 1).

CITATION LIST

Non-Patent Document

Non-Patent Document 1: Takuto Arai, Daisuke Goto, Masashi Iwabuchi, Tatsuhiko Iwakuni, and Kazuki Maruta, "AMAP: Adaptive Movable Access Point System for Offloading Efficiency Enhancement", IEICE Technical Report, vol. 116, no. 46, RCS2016-43, pp. 107-112, May 2016

SUMMARY OF INVENTION

Technical Problem

However, when the movable base station is dynamically deployed, if power that is transmitted from the movable base station and is received by each of terminals is excessively large, compared to other base stations, many terminals are autonomously connected to the movable base station, and excessive deviation in the terminal connection may occur, which may result in reductions in the communication quality.

FIG. 1 is a diagram for describing a problem of a conventional technology. In FIG. 1, an exemplary case in which two movable base stations are additionally installed in an environment where there are three existing base stations and 11 terminals will be described as follows. (1) of FIG. 1 illustrates a state before the movable base stations are deployed, and (2) illustrates a state after the movable base stations are deployed.

In (1) in which the state is held before the movable base stations are deployed, one terminal is connected to an existing base station on the left-hand side, and five terminals are connected to each of the other two existing base stations. A broken line connecting each terminal and the existing base station indicates a connection relationship between the terminal and the existing base station. In this state, the two existing base stations are congested. Therefore, by deploying one movable base station for each of the two existing base stations, the congestion is resolved or alleviated.

In the conventional technology, a deployment position of the movable base station is calculated by clustering 10 terminals connected to any one of the two congested existing base stations. As a result, for example, movable base stations are installed as illustrated in (2). In (2), each cluster is indicated by a frame line in a curve, and an example in which the movable base station is deployed at a center of gravity of each cluster is shown.

When a given terminal can receive signals from a plurality of base stations, the given terminal operates to connect to a base station such that the highest received power is obtained in a general wireless system. Therefore, when the movable base stations are deployed as illustrated in (2), five terminals are connected to one movable base station, and two terminals are connected to the other movable base station. As a result, congestion of the existing base stations in which the congestion occurs in (1) is resolved, but one movable base station becomes congested. As described above, according to the conventional technology, there is a possibility that the number of terminals that are connected to each base station is excessively unequal (existing base station or movable base station).

The present invention has been made in view of the above points, and an object of the present invention is to reduce an unequal number of terminals connected to each base station.

Solution to Problem

Therefore, in order to solve the above problem, in a base station control system including a first base station and a base station control apparatus, the base station control apparatus includes a setting unit configured to set, to the first base station, at least one of a first threshold value regarding a reception power from a terminal in the first base station and a second threshold value indicating a maximum number of a number of terminals connected to the first base station as a threshold value for limiting terminals capable of connecting to the first base station.

Advantageous Effects of Invention

It is possible to reduce an unequal number of terminals connected to each base station.

BRIEF DESCRIPTION OF DRAWINGS

FIG. 2 is a diagram illustrating a configuration example of a communication system 1 according to an embodiment of the present invention.

FIG. 8 is a diagram illustrating an example of the number of terminals connected to each base station before and after the movable base stations are placed.

DESCRIPTION OF EMBODIMENTS

Figure 2:
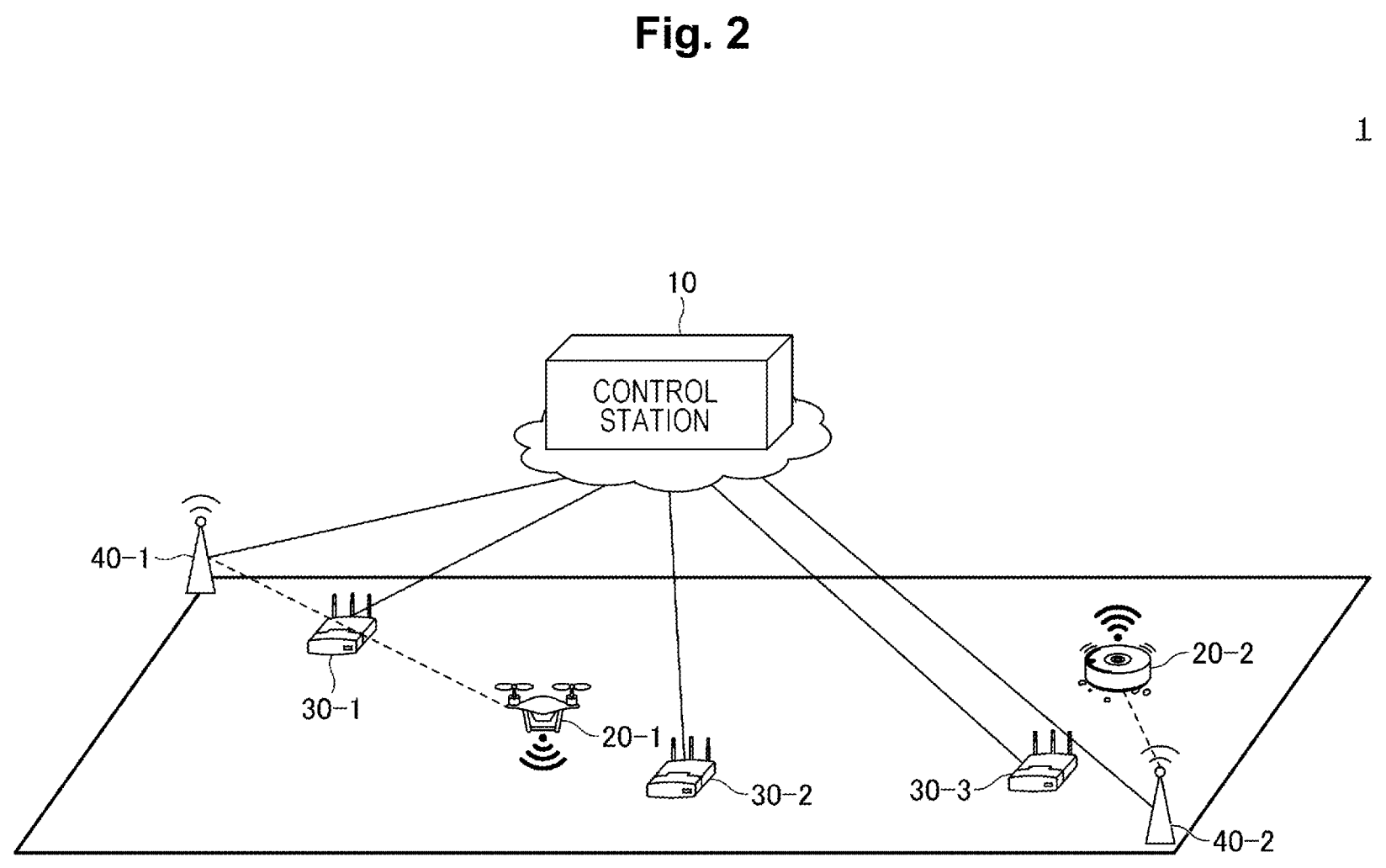
Figure 1:
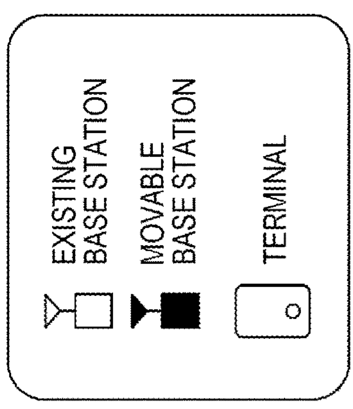
FIG. 1 is a diagram for describing a problem of a conventional technology.
Figure 1:
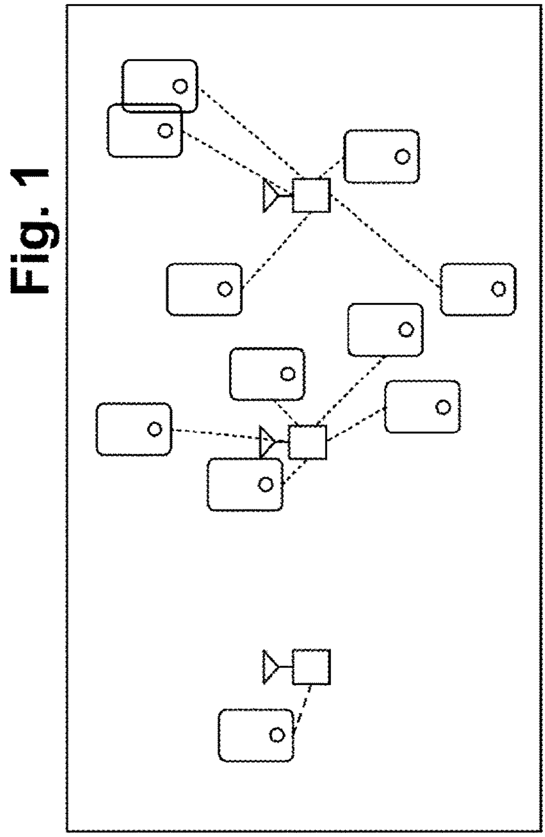
Figure 1:
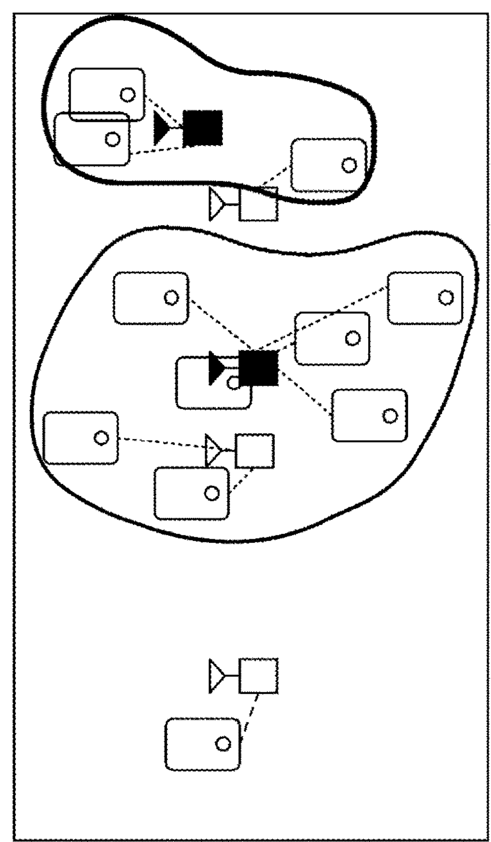

Hereinafter, embodiments of the present invention will be described with reference to the drawings. FIG. 2 is a diagram illustrating a configuration example of a communication system in an embodiment of the present invention. As illustrated in FIG. 2, the communication system 1 includes one or more existing base stations 30, one or more movable base stations 20, one or more relay base stations 40, a control station 10, and the like. Note that a base station refers to a base station (access point) in wireless communication (for example, a wireless LAN).

The existing base station 30 is an existing base station in the present embodiment. In the present embodiment, the existing base station 30 is not targeted for movement, but the existing base station 30 may be movable.

The movable base station 20 is a base station that is movable, and is a base station that is newly deployed (deployment position is not determined) in the present embodiment. For example, in a case or the like where communications with a certain existing base station 30 becomes congested, the movable base station 20 is dynamically deployed. Note that a drive approach to move the movable base station 20 is not limited to a specific device. For example, a vehicle, a drone, or the like may be used as the drive approach. In addition, the movable base station 20 may be configured to move on a rail provided in advance.

The relay base station 40 is a base station that relays communication between the movable base station 20 and the control station 10. The relay base station 40 is connected to the movable base station 20 by wireless communications. Therefore, the movable base station 20 is movable within a range in which wireless communications with the relay base station 40 can be performed.

Note that, hereinafter, in a case where the existing base station 30 and the movable base station 20 are not distinguished, they are simply referred to as "base stations". Each terminal 50 is connected to any base station by autonomous control. The autonomous control is, for example, a control in which connection to a closer base station is performed and in which connection to a base station that allows for relatively large received power when there are a plurality of base stations having substantially the same distance to a given terminal.

The control station 10 is one or more computers that control the movable base station 20. The control station 10 is connected to each existing base station 30 and each relay base station 40 via a network (wired or wireless) and can collect information from each existing base station 30 and each relay base station 40. Information on each existing base station 30 and information on each movable base station 20 can be collected.

Note that, although not illustrated, there are a plurality of terminals (hereinafter referred to as terminals 50) that wirelessly connect to any base station and perform communication with the base station.

Figure 3:
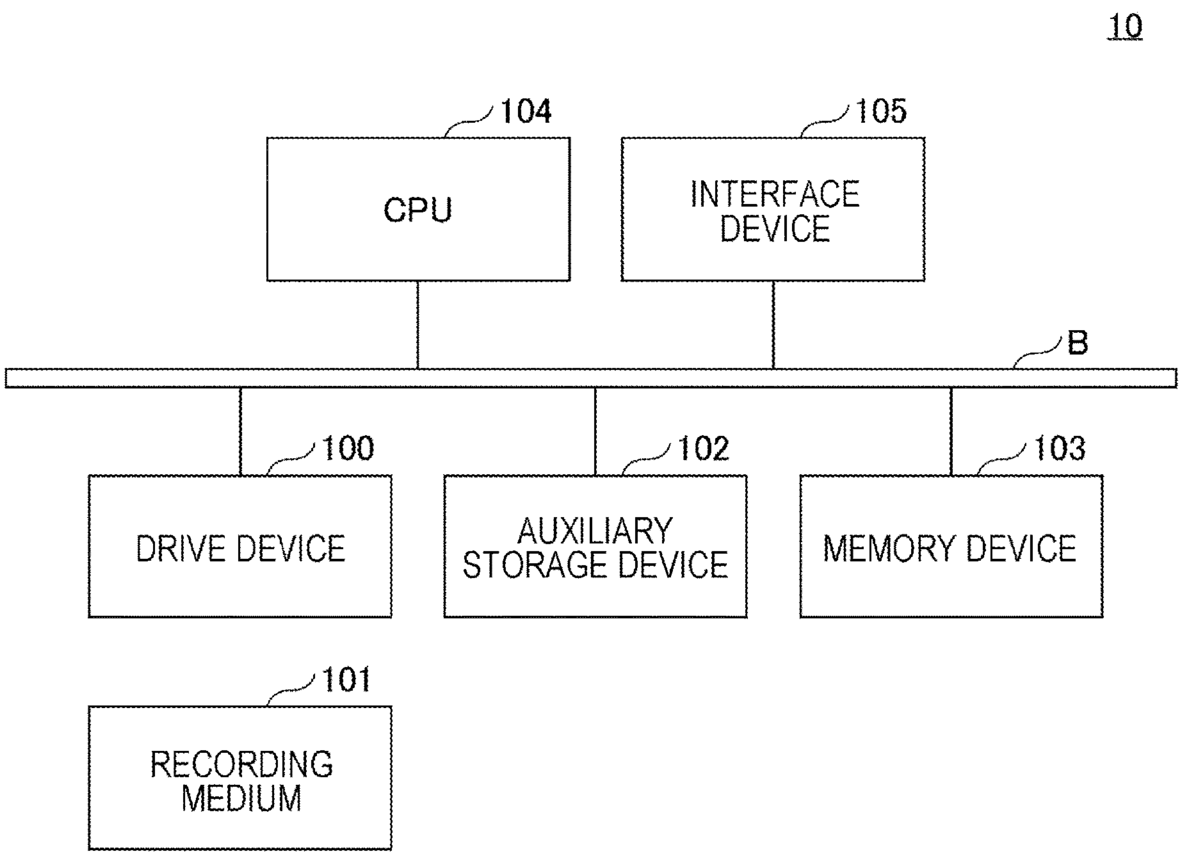
FIG. 3 is a diagram illustrating a hardware configuration example of a control station 10 in the embodiment of the present invention.

FIG. 3 is a diagram illustrating a hardware configuration example of the control station 10 in the embodiment of the present invention. The control station 10 of FIG. 3 includes a drive device 100, an auxiliary storage device 102, a memory device 103, a CPU 104, an interface device 105, and the like which are connected to one another via a bus B.

A program for realizing processing in the control station 10 is provided by a recording medium 101 such as a CD-ROM. When the recording medium 101 storing the program is set in the drive device 100, the program is installed on the auxiliary storage device 102 from the recording medium 101 via the drive device 100. Here, the program is not necessarily installed from the recording medium 101 and may be downloaded from another computer via the network. The auxiliary storage device 102 stores the installed program and also stores necessary files, data, and the like.

When an instruction to start the program is received, the memory device 103 reads the program from the auxiliary storage device 102 to store the program in the memory device 103. The CPU 104 executes a function related to the control station 10 according to the program stored in the memory device 103. The interface device 105 is used as an interface for connecting to the network.

Figure 4:
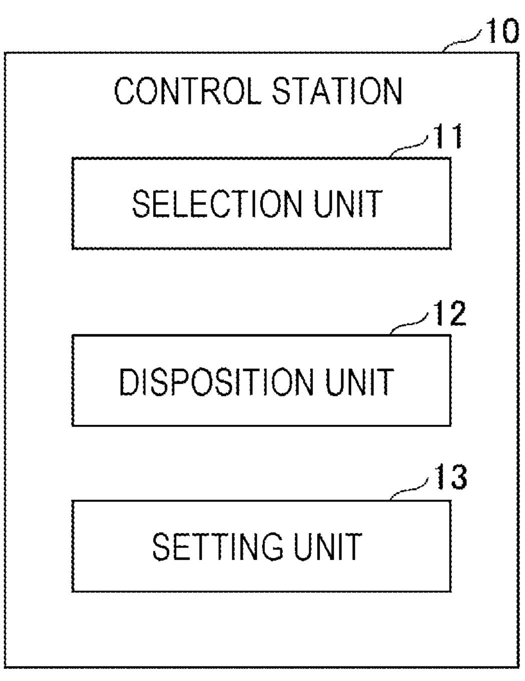
FIG. 4 is a diagram illustrating a functional configuration example of the control station 10 in the embodiment of the present invention.

FIG. 4 is a diagram illustrating a functional configuration example of the control station 10 in the embodiment of the present invention. In FIG. 4, the control station 10 includes a selection unit 11, a deployment unit 12, and a setting unit 13. Each of these units is realized by the CPU 104 executing one or more programs installed in the control station 10.

Figure 5:
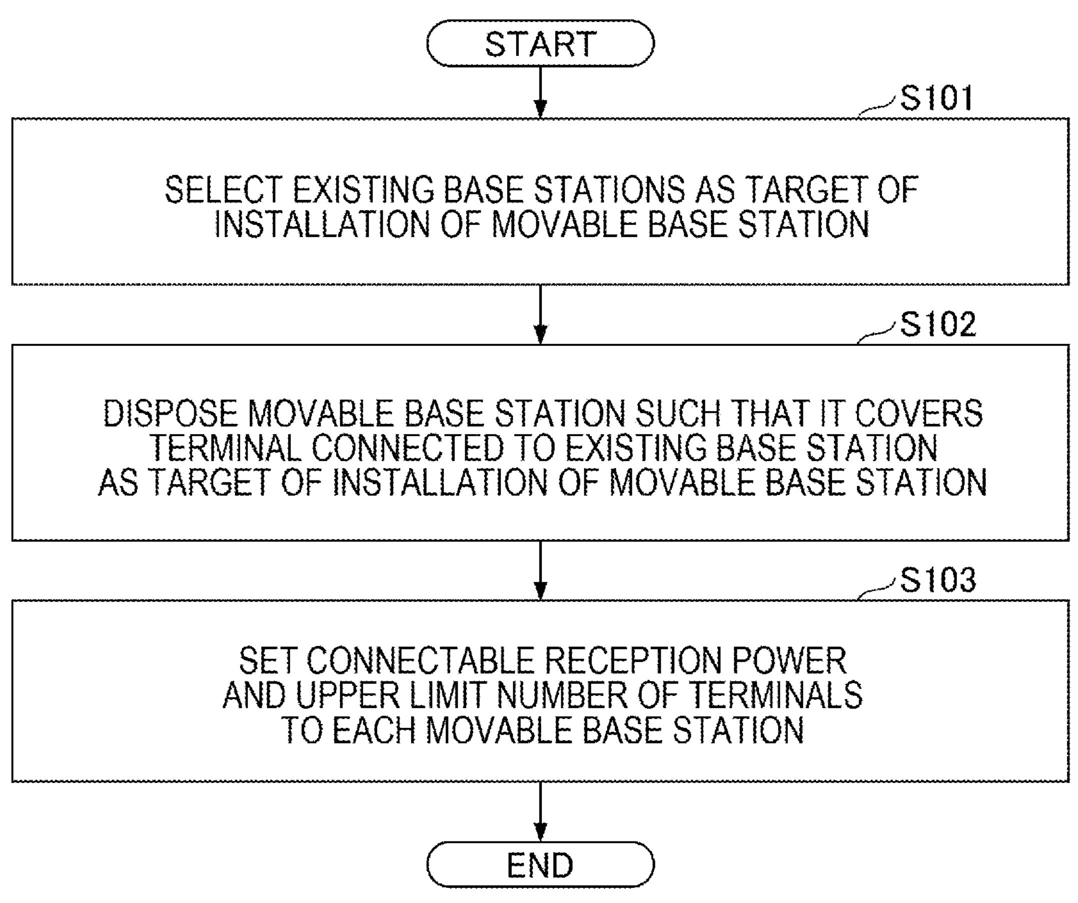
FIG. 5 is a flowchart for describing an example of a processing procedure executed by the control station 10.

Hereinafter, a processing procedure executed by the control station 10 will be described. FIG. 5 is a flowchart for describing an example of the processing procedure executed by the control station 10.

In step S101, the selection unit 11 selects an existing base station 30 (hereinafter, referred to as a "target existing base station 30") as a target for the movable base station 20 (the target for which a load is to be reduced by the movable base station 20), on the basis of the number of terminals connected to each existing base station 30. For example, the existing base station 30 for which connection to one or more terminals is relatively congested is selected as the target existing base station 30. In this case, the selection unit 11 determines whether each existing base station 30 that connects to one or more terminals is congested. For example, the selection unit 11 determines that the existing base station 30 to which the number of terminals connected (the number of connected terminals) is equal to or greater than a predetermined threshold value is congested.

Figure 6:
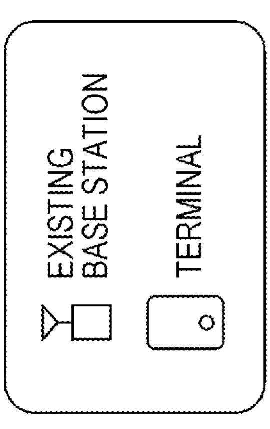
FIG. 6 is a diagram illustrating a specific example of a connection state of a terminal to an existing base station 30.
Figure 6:
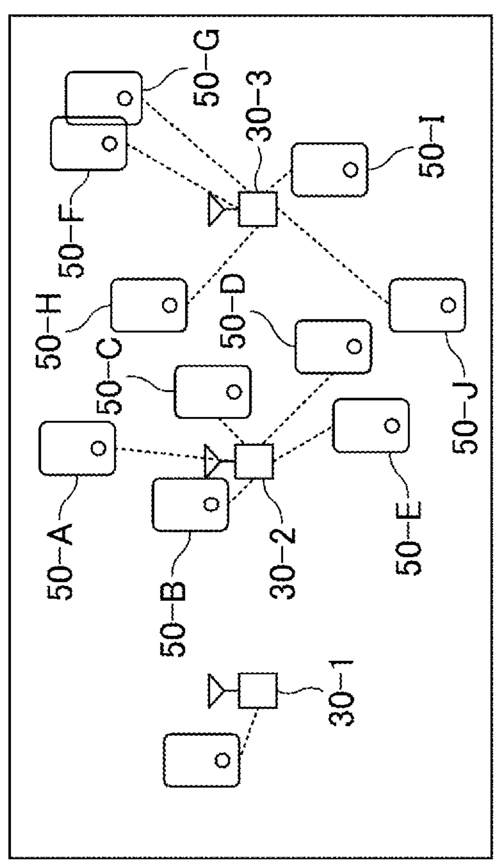

FIG. 6 is a diagram illustrating a specific example of connection states of terminals to existing base stations 30. In the present embodiment, it is assumed that three existing base stations 30 are installed, and two movable base stations 20 are additionally installed in a state where 11 terminals 50 are connected to any of the existing base stations 30. In the figure, a broken line connecting a terminal 50 and a base station indicates a connection relationship between the terminal 50 and the base station (which base station is connected to the terminal 50). Therefore, in the example of FIG. 6, the number of connected terminals of an existing base station 30-1 is 1, the number of connected terminals of an existing base station 30-2 is 5, and the number of connected terminals of an existing base station 30-3 is 5.

Here, assuming that the threshold value for determining congestion of the existing base stations 30 is 5, it is determined that two existing base stations 30-2 and 30-3 are congested in the example of FIG. 6. Therefore, these two existing base stations 30 are selected as target existing base stations 30. Note that, when the number of corresponding existing base stations 30 exceeds the number (2 in the present embodiment) of movable base stations 20, a given number of existing base stations 30 may be selected as target existing base stations 30, for example, in a case where the existing base stations 30 are arranged in descending order of the number of connected terminals.

Alternatively, as another determination method, if the number of connected terminals is included in upper α% of all the existing base stations 30, it may be determined that it is congested, and if it is not included, it may be determined that it is not congested. α is a parameter, and for example, when α=50, the existing base stations 30 of upper 50% are in a congestion state.

Alternatively, as another determination method, an existing base station 30 in which the number of connected terminals exceeds the average number of connected terminals of all the existing base stations 30 may be determined to be in a congestion state.

Subsequently, for each target existing base station 30, the deployment unit 12 controls deployment of each movable base station 20 at a position at which the target existing base station 30 covers one or more terminals 50 to be connected to the target existing base station 30 (S102). Therefore, for example, one movable base station 20 is deployed for one target existing base station 30. A position that covers one or more terminals 50 to be connected to a certain target existing base station 30 is, for example, a position at which a radio wave reaches the terminals 50 with predetermined power or larger. A position that covers one or more terminals 50 to be connected to each target existing base station 30 may be determined by a conventional method or another method. For example, the center of gravity of a set of terminals 50 connected to a certain target existing base station 30 may be determined as a position that covers (the set of) the terminals 50.

Subsequently, for each movable base station 20, as a threshold value for limiting the number of terminals 50 to be connected to the movable base station 20, the setting unit 13 sets, in a given base station, at least one of possible received power that is used as a threshold value regarding power that is received from a given terminal 50 at the given base station (signal power received from the given terminal 50); or a maximum number of terminals that is used as a threshold value indicating a maximum number of terminals connected to the given base station (S103). The possible received power by a certain movable base station 20 is used as a threshold value (lower limit value) of received power for permitting connection to the movable base station 20, among power received from the terminal 50 at the movable base station 20.

The possible received power is used as a setting value for suppressing connection to one or more terminals that are out of range to be covered by the movable base station 20 (an area range equivalent to an area range covered by the other base station), and the setting unit 13 sets, for example, a predetermined initial value (for example, −65 dBm) as the possible received power. Thereafter, the setting unit 13 changes the possible received power by the movable base station 20, on the basis of comparison between the number of terminals connected to the movable base station 20 and the number of terminals connected to connections of a neighboring base station (a given base station (for example, the target existing base station 30) being within a certain range from the movable base station 20). Specifically, the setting unit 13 compares the number of terminals connected to the movable base station 20 with the number of terminals connected to the neighboring base station (a given base station (for example, the target existing base station 30) that is within a certain range from the movable base station 20)), and then decreases the possible received power by the movable base station 20, by a predetermined value, when the number of terminals connected to the movable base station 20 is less than the number of terminals connected to the neighboring base station by a certain number or greater. On the other hand, when the number of terminals connected to the movable base station 20 is greater than the number of terminals connected to the neighboring base station by the certain number or more, the setting unit 13 increases the possible received power by the movable base station 20 by a predetermined value.

For the maximum number of terminals, the setting unit 13 sets, for example, a predetermined initial value (for example, three). Thereafter, the setting unit 13 changes the maximum number of terminals for the movable base station 20 on the basis of comparison between the number of terminals connected to the movable base station 20 and the number of terminals connected to the neighboring base station (a base station (for example, the target existing base station 30) within a certain range from the movable base station 20). Specifically, the setting unit 13 compares the number of terminals connected to the movable base station 20 with the number of terminals connected to a neighboring base station of the movable base station, and increases the maximum number of terminals for the movable base station 20 by a predetermined value when the number of terminals connected to the movable base station 20 is less than the number of terminals connected to the neighboring base station by a certain number or greater. On the other hand, when the number of terminals connected to the movable base station 20 is greater than the number of terminals connected to the neighboring base station by a certain number or greater, the setting unit 13 decreases the maximum number of terminals for the movable base station 20 by a predetermined value.

According to the above example, initially, −65 dBm or more of possible received power and 3 of the maximum number of terminals are set in each movable base station 20.

Note that a case where changes in a value that is made based on comparison between the number of terminals connected to the movable base station 20 and the number of terminals connected to the neighboring base station may occur for only one or both of the possible received power and the maximum number of terminals.

Figure 7:
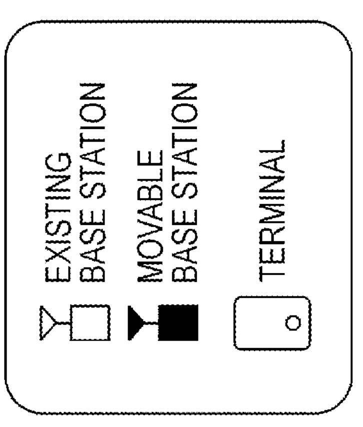
FIG. 7 is a diagram illustrating an example of a connection state of one or more terminals to each base station after movable base stations are placed.
Figure 7:
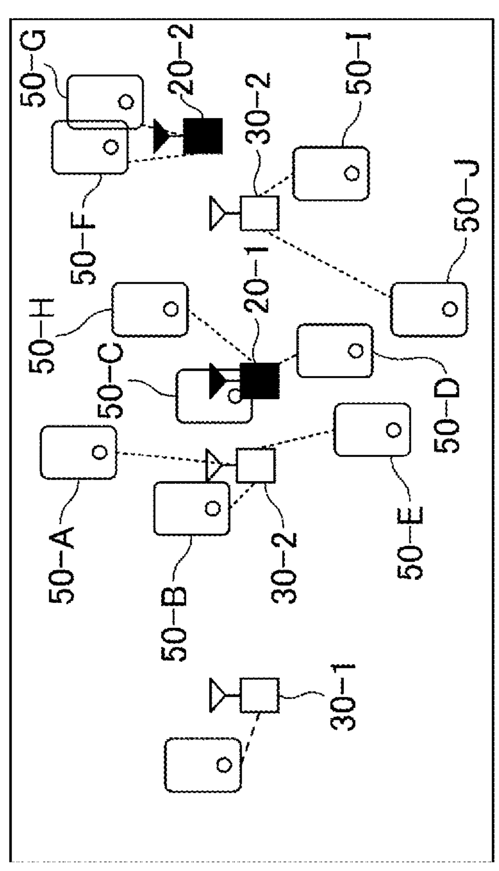

The movable base station 20 for which possible received power is set does not connect a terminal 50 whose received power is smaller than the possible received power. The movable base station 20 for which the maximum number of terminals is set does not connect a new terminal 50 when the number of connected terminals has reached the maximum number of terminals. Each terminal 50 that the movable base station 20 does not connect to is to be connected to any existing base station 30, and as a result, a state in which terminals 50 are each connected to any base station is as illustrated in FIG. 7, for example. As a result, as illustrated in FIG. 8, the number of terminals connected to each base station is leveled as compared with the case of (2) in FIG. 1. In the table of FIG. 8, the base station number matches the code of each base station. In the table, values for "before deployment of movable base stations" and "after deployment of movable base stations" for each base station indicate the respective numbers of terminals connected to each base station before deployment of the movable base stations 20 and after deployment of the movable base stations 20.

As described above, according to the present embodiment, the possible received power and the maximum number of terminals, and two threshold values for the two items described above are dynamically controlled. As a result, it is possible to reduce a difference between the numbers of terminals connected to base stations. As a result, improvements in the communication quality can be expected.

Note that, in the present embodiment, at least one among the possible received power and the maximum number of terminals, and the like may be appropriately changed according to a state in which one or more terminals are connected to each movable base station 20 and each neighboring base station, which varies according to a change in the number of terminals 50, or movement of the terminals 50, the change and movement being enabled after setting is performed for the movable base stations 20. For example, the setting unit 13 may change a threshold value in a case where a difference between the number of terminals connected to a certain movable base station 20 and the number of terminals connected to any neighboring base station is equal to or larger than a predetermined value. As an example, in a case where the difference is equal to or larger than the predetermined value, the setting unit 13 decreases the maximum number of terminals for the movable base station 20 or increases the possible received power by the movable base station 20 if a greater number of terminals connected to the movable base station 20 is obtained. In addition, in a case where the difference is equal to or larger than the predetermined value, the setting unit 13 increases the maximum number of terminals for the movable base station 20 or decreases the possible received power by the movable base station 20 if a greater number of terminals connected to the neighboring base station is obtained.

In addition, in order to reduce unevenness of distances that result in connections and disconnections, a disconnection threshold value for connection may be further set. That is, a control in which a threshold value is used may also be performed for "disconnection" between a terminal 50 and a base station. As a result, for example, it is possible to perform a control such that "connection" is permitted when −65 dBm or more is obtained and such that "disconnection" is performed when −75 dBm or less is obtained.

Furthermore, the setting unit 13 may set a transmission rate and transmitted power of a beacon signal for each movable base station 20, in addition to setting the possible received power.

Further, in addition to permitting connection, a response to active scanning such as a probe request may also be controllable.

A threshold value may be set in consideration of a backhaul line speed of the movable base station 20.

Note that the present embodiment may be applied not only to controlling of movable base stations but also to controlling of fixed base stations. For example, possible received power and a maximum number of terminals may be set for a newly installed fixed base station (to which no terminal is connected).

Note that the present embodiment may be applied not only to controlling of movable base stations but also to controlling of fixed base stations. For example, the present embodiment may be applied to a newly installed fixed base station (to which no terminal is connected).

Note that, in the present embodiment, the movable base station 20 is an example of a first base station. The existing base station 30 is an example of a second base station. The control station 10 is an example of a base station control apparatus. The possible received power is an example of a first threshold value. The maximum number of terminals is an example of a second threshold value.

Although the embodiments of the present invention have been described in detail above, the present invention is not limited to such specific embodiments, and various modifications and changes can be made within the scope of the gist of the present invention described in the claims.

REFERENCE SIGNS LIST

1 Communication system
10 Control station
11 Selection unit
12 Deployment unit
13 Setting unit
20 Movable base station
30 Existing base station
40 Relay base station
50 Terminal
100 Drive device
101 Recording medium
102 Auxiliary storage device
103 Memory device
104 CPU
105 Interface device
B Bus

The invention claimed is:

1. A base station control system, comprising:
a first base station;
a second base station; and
a base station control apparatus including circuitry configured to
deploy the first base station at a position within a coverage area of the second base station,
set, in the first base station, a first threshold value indicating power to be received from a terminal and a second threshold value indicating a maximum number of terminals that are to be connected to the first base station, the power being configured to be received by the first base station,
set a first predetermined value and a second predetermined value to change the first threshold value,
set a third predetermined value and a fourth predetermined value to change the second threshold value,
compare a first number of terminals that are connected to the first base station with a second number of terminals that are connected to the second base station,
in response to determining that the first number of terminals is less than the second number of terminals by a first reference value or more, decrease the first threshold value by the first predetermined value and increase the second threshold value by the third predetermined value, the first reference value is used to determine whether or not the first threshold and the second threshold need to be changed, and
in response to determining that the first number of terminals is greater than the second number of terminals by a second reference value or more, increase the first threshold value by the second predetermined value and decrease the second threshold value by the fourth predetermined value, the second reference value is used to determine whether or not the first threshold and the second threshold need to be changed, and
wherein each of the power to be received and the maximum number is used to limit the number of terminals that are to be connected to the first base station.

2. The base station control system according to claim 1, wherein the circuitry is configured to change the at least one of the power to be received from the terminal or the maximum number of terminals, based on a change in the number of terminals or a change in a state in which one or more terminals are connected to the first base station in accordance with movement of the terminals.

3. The base station control system according to claim 1, further comprising: a plurality of second base stations including the second base station;
wherein the first base station is movable; and wherein the circuitry is configured to select one of the second base stations, based on a number of terminals connected to each of the second base stations, and deploy the first base station at the position within a coverage area of the selected second base station.

4. A base station control method executed by a base station control apparatus, the base station control method comprising:

deploying a first base station at a position within a coverage area of a second base station, setting, in the first base station, a first threshold value indicating power to be received from a terminal and a second threshold value indicating a maximum number of terminals that are to be connected to the first base station, the power being configured to be received by the first base station, setting a first predetermined value and a second predetermined value to change the first threshold value, setting a third predetermined value and a fourth predetermined value to change the second threshold value, comparing a first number of terminals that are connected to the first base station with a second number of terminals that are connected to the second base station, in response to determining that the first number of terminals is less than the second number of terminals by a first reference value or more, decreasing the first threshold value by the first predetermined value and increasing the second threshold value by the third predetermined value, the first reference value is used to determine whether or not the first threshold and the second threshold need to be changed, and in response to determining that the first number of terminals is greater than the second number of terminals by a second reference value or more, increasing the first threshold value by the second predetermined value and decreasing the second threshold value by the fourth predetermined value, the second reference value is used to determine whether or not the first threshold and the second threshold need to be changed, and wherein each of the power to be received and the maximum number is used to limit the number of terminals that are to be connected to the first base station.

5. A non-transitory computer readable medium storing a program causing a computer to execute the base station control method of claim 4.

6. A base station control apparatus comprising:

circuitry configured to deploy a first base station at a position within a coverage area of a second base station, set, in the first base station, a first threshold value indicating power to be received from a terminal and a second threshold value indicating a maximum number of terminals that are to be connected to the first base station, the power being configured to be received by the first base station, set a first predetermined value and a second predetermined value to change the first threshold value, set a third predetermined value and a fourth predetermined value to change the second threshold value, compare a first number of terminals that are connected to the first base station with a second number of terminals that are connected to the second base station, in response to determining that the first number of terminals is less than the second number of terminals by a first reference value or more, decrease the first threshold value by the first predetermined value and increase the second threshold value by the third predetermined value, the first reference value is used to determine whether or not the first threshold and the second threshold need to be changed, and in response to determining that the first number of terminals is greater than the second number of terminals by a second reference value or more, increase the first threshold value by the second predetermined value and decrease the second threshold value by the fourth predetermined value, the second reference value is used to determine whether or not the first threshold and the second threshold need to be changed, and wherein each of the power to be received and the maximum number is used to limit the number of terminals that are to be connected to the first base station.

* * * * *